US008695278B2

(12) United States Patent
Koberling

(10) Patent No.: US 8,695,278 B2
(45) Date of Patent: Apr. 15, 2014

(54) DOOR ASSEMBLY FOR AN INSTRUMENT CABINET AND METHOD FOR CHANGING A HINGE SIDE OF A DOOR ASSEMBLY

(75) Inventor: Toni Koberling, Gräfelfing (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 13/697,430

(22) PCT Filed: May 19, 2011

(86) PCT No.: PCT/EP2011/058188
§ 371 (c)(1),
(2), (4) Date: Jan. 10, 2013

(87) PCT Pub. No.: WO2011/144708
PCT Pub. Date: Nov. 24, 2011

(65) Prior Publication Data
US 2013/0111817 A1 May 9, 2013

(30) Foreign Application Priority Data

May 21, 2010 (DE) .......................... 10 2010 021 166
Nov. 10, 2010 (DE) .......................... 10 2010 050 965

(51) Int. Cl.
*E05D 15/50* (2006.01)
(52) U.S. Cl.
USPC ................................ 49/382; 49/193; 312/324
(58) Field of Classification Search
USPC ............ 49/192, 193, 382; 312/324, 326–329, 312/216–218; 292/32, 33, 38, 37, 42, 292/DIG. 17
See application file for complete search history.

(56) References Cited

U.S. PATENT DOCUMENTS 3,048,899 A * 8/1962 Vincent et al. ................... 49/152
3,403,473 A * 10/1968 Navarro .......................... 49/193

(Continued)

FOREIGN PATENT DOCUMENTS

CH 598 703 AS 5/1978
DE 31 38 872 A1 4/1983

(Continued)

OTHER PUBLICATIONS

Japanese Office Action issued on Oct. 22, 2013 in corresponding Japanese Patent Application No. 2013-510628.

*Primary Examiner* — Katherine Mitchell
*Assistant Examiner* — Justin Rephann
(74) *Attorney, Agent, or Firm* — DLA Piper LLP (US)

(57) ABSTRACT

A door assembly for an instrument cabinet includes a door element having a first side edge and a second side edge opposite the first side edge adapted for installation in a predetermined orientation, at least two first withdrawable pins in a region of the first side edge and at least two second pins which form a pivot axis in a region of the second side edge, wherein, in an extended condition, the first pins are in communication with a first depression in the instrument cabinet to prevent the door element pivoting about the pivot axis and, in a withdrawn condition, extend out of the first depression to permit the door element to pivot about the pivot axis, at least one handle element having a fixed part that secures to a front side of the door element and a movable part that mechanically couples to the two first pins, wherein actuation of the movable part allows the first pins which are coupled thereto, to move into a retracted condition, wherein the door element and/or the handle element are of symmetrical construction such that releasing the handle element, turning it through 180 degrees and securing the turned handle element enables functional elements to close the door assembly to be switched from the first side edge to the second side edge and vice versa.

20 Claims, 4 Drawing Sheets

(56) References Cited

U.S. PATENT DOCUMENTS

| | | | |
|---|---|---|---|
| 3,430,386 A * | 3/1969 | Schmitt et al. | 49/382 |
| 3,863,391 A | 2/1975 | Horvay et al. | |
| 3,878,647 A | 4/1975 | Bürgers | |
| 3,878,657 A | 4/1975 | Ferver | |
| 4,811,518 A * | 3/1989 | Ladisa | 49/193 |
| 5,367,828 A * | 11/1994 | Hashemnia | 49/382 |
| 5,675,934 A * | 10/1997 | Park | 49/193 |
| 5,926,916 A * | 7/1999 | Lee et al. | 16/230 |
| 5,970,660 A * | 10/1999 | Jacobs | 49/425 |
| 5,983,453 A | 11/1999 | Miwa | |
| 6,085,463 A * | 7/2000 | Yoshikawa | 49/193 |
| 6,688,657 B2 | 2/2004 | Peacock et al. | 292/35 |
| 7,178,292 B2 * | 2/2007 | Yamada | 49/193 |
| 7,699,412 B2 * | 4/2010 | Heimler et al. | 312/217 |
| 7,781,675 B2 * | 8/2010 | Adducci et al. | 174/50 |
| 7,789,471 B2 * | 9/2010 | Fromme et al. | 312/217 |
| 8,136,203 B2 | 3/2012 | Klassen et al. | |
| 8,496,307 B2 * | 7/2013 | Bergesch et al. | 312/352 |
| 2003/0080567 A1 | 5/2003 | Peacock et al. | |
| 2009/0139145 A1 | 6/2009 | Watanabe et al. | |
| 2013/0015750 A1 * | 1/2013 | Sekol et al. | 312/218 |

FOREIGN PATENT DOCUMENTS

| | | |
|---|---|---|
| DE | 85 04 662 U1 | 5/1985 |
| DE | 86 25 578 U1 | 3/1988 |
| DE | 202 16 744 U1 | 1/2003 |
| DE | 10 2007 017 916 B3 | 6/2008 |
| DE | 10 2007 012 980 A1 | 9/2008 |
| EP | 0 891 027 A1 | 1/1999 |
| EP | 0 995 867 A2 | 4/2000 |
| EP | 1 274 158 A1 | 1/2003 |
| EP | 1 835 586 A1 | 9/2007 |
| JP | 49-28944 | 3/1974 |
| JP | 56-140669 | 10/1981 |
| JP | 2009-133147 | 6/2009 |

* cited by examiner

DOOR ASSEMBLY FOR AN INSTRUMENT CABINET AND METHOD FOR CHANGING A HINGE SIDE OF A DOOR ASSEMBLY

RELATED APPLICATIONS

This is a §371 of International Application No. PCT/EP2011/058188, with an international filing date of May 19, 2011 (WO 2011/144708 A2, published Nov. 24, 2011), which is based on German Patent Application Nos. 10 2010 021 166.4, filed May 21, 2010, and 10 2010 050 965.5, filed Nov. 10, 2010, the subject matter of which is incorporated herein by reference.

TECHNICAL FIELD

This disclosure relates to a door assembly for an instrument cabinet and method for changing a hinge side of a door assembly.

BACKGROUND

Door assemblies for an instrument cabinet can have a front door for a 19" rack which may alternatively be hinged on the right or left sides. Depending on the prevailing conditions, the customer decides which hinge side is better and is to be in a position to implement this as simply as possible by performing a conversion.

One solution is to turn the door through 180° (to put it upside down) and, hence, to change the hinge side. A disadvantage of this is that the entire design is upside down (logos, design elements). Moreover, this solution requires the door to be of symmetrical construction for all the functional elements such as the handle and the lock, as well.

Another solution is to leave the door in its orientation and to remount all the functional parts (hinges, handles and opener, lock) to switch sides. That solution is relatively complex.

DE 10 2007 012 980 A1 discloses a door assembly for closing a housing aperture having a first hinge, which is constructed on a first hinge side of the door leaf, and a second hinge side, which is opposite the first hinge side and on which a second hinge is constructed. With an actuating element that has the three actuation positions "closed," "disengage the first hinge" and "disengage the second hinge," the first and second hinges can, together with the actuating element, form a closing mechanism that, depending on the actuation position of the actuating element at one or both hinge sides of the door leaf, form a hinge or a closure.

SUMMARY

I provide a door assembly for an instrument cabinet including a door element having a first side edge and a second side edge opposite the first side edge adapted for installation in a predetermined orientation, at least two first withdrawable pins in a region of the first side edge and at least two second pins which form a pivot axis in a region of the second side edge, wherein, in an extended condition, the first pins are in communication with a first depression in the instrument cabinet to prevent the door element pivoting about the pivot axis and, in a withdrawn condition, extend out of the first depression to permit the door element to pivot about the pivot axis, at least one handle element having a fixed part that secures to a front side of the door element and a movable part that mechanically couples to the two first pins, wherein actuation of the movable part allows the first pins which are coupled thereto to move into a retracted condition, wherein the door element and/or the handle element are of symmetrical construction such that releasing the handle element, turning it through 180 degrees and securing the turned handle element enables functional elements to close the door assembly to be switched from the first side edge to the second side edge and vice versa.

I also provide a method for changing a hinge side of a door arrangement including a door element adapted for installation in a predetermined orientation, having a first side edge and a second side edge opposite the first side edge, at least one closing mechanism formed by two first withdrawable pins in a region of the first side edge and at least one pivot axis, which is formed by two second pins in a region of the second side edge and at least one handle element having a fixed part that secures to a front side of the door element and a movable part mechanically coupled to the two first pins to withdraw the two first pins including releasing the handle element from the door element, wherein the mechanical coupling to the two first withdrawable pins is released, turning the handle element through 180 degrees in relation to the door element such that the movable part is switched from the first side edge to a second side edge, and securing the turned handle element to the door element.

LIST OF REFERENCE NUMERALS

Figure 1A:
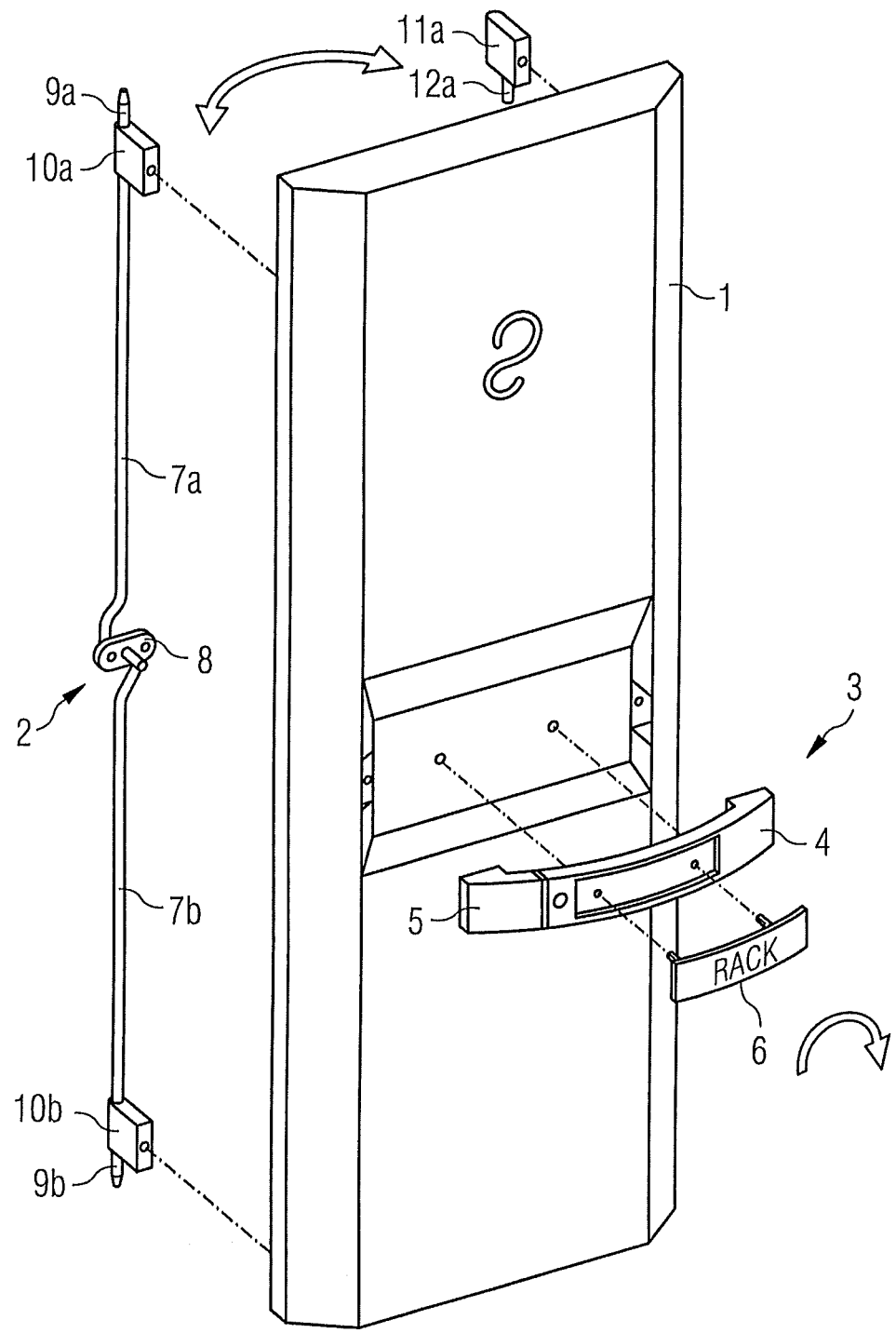
FIGS. 1A and 1B show a first example of a door assembly.

1 Door element
2 Pushrod system
3 Handle element
4 Fixed part
5 Movable part
6 Cladding element
7 Pushrod
8 Coupling element
9 First pin
10 First bearing block
11 Second bearing block
12 Second pin
13 Hinge pin
14 Coupling pin

DETAILED DESCRIPTION

My door assembly for an instrument cabinet or similar may include a door element for installation in a predetermined orientation, having a first side edge and a second side edge opposite the first side edge. Further, the door assembly includes at least two first withdrawable pins in the region of the first side edge and at least two second pins, which form a pivot axis, in the region of the second side edge wherein, in an extended condition, the first pins are in communication with a depression in the instrument cabinet to prevent the door pivoting about the pivot axis and, in a withdrawn condition, extend out of the first depression to permit the door to pivot about the pivot axis.

Further, the door assembly includes at least one handle element having a fixed part to secure to a front side of the door element and a movable part that mechanically couples to the two first pins, wherein actuation of the movable part allows the first pins, which are coupled thereto, to move into the retracted condition, and wherein the door element and/or the handle element are of symmetrical construction, with the result that releasing the handle element, turning it through 180° and securing the turned handle element enables functional elements to close the door assembly to be switched from the first side edge to the second side edge and vice versa.

By providing a handle element that is rotationally symmetrical, functional elements of the door assembly may be switched from one side edge to the other side edge relatively simply. In particular, it is possible to switch the movable part of the handle element from left to right and thus also to simplify switching a closing mechanism from left to right.

The two first pins and the two second pins may be releasably connected to the door element by securing means, wherein the securing means are constructed such that the two first pins and the two second pins may be switched with one another to perform a change of the pivot axis from the first side edge to the second side edge.

It is possible that withdrawable hinge pins are mounted fixed on both sides of a door element. At least one handle element having a fixed part and a movable part may be secured to a front side of the door element. The fixed part of the handle element substantially serves as a handle to hold or pull the door. The movable part moreover serves as a lock or catch and enables the associated hinge pins to be withdrawn in the region either of the left or the right edge of the door element. To change the hinge direction, the door element and/or the handle element is of symmetrical construction, with the result that releasing the handle element, turning it through 180° and securing the turned handle element enables the hinge side of the door assembly to be switched from left to right or vice versa.

Figure 1B:
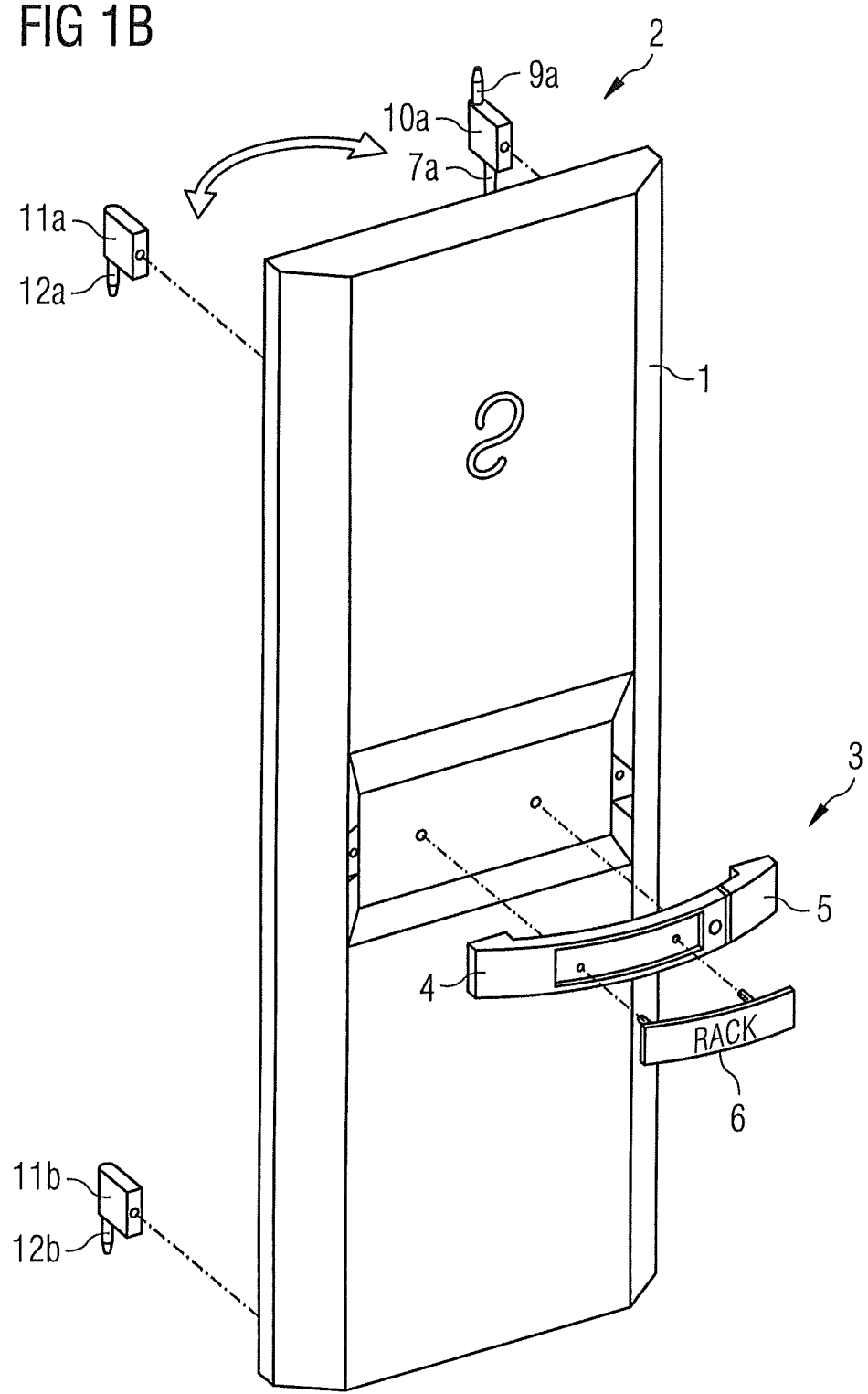

Turning now to the Drawings, FIGS. 1A and 1B illustrate a first example of a door assembly for an instrument cabinet. FIG. 1A shows an exploded illustration of the door assembly in a configuration for a door hinged on the right side, and FIG. 1B shows an exploded illustration of the door assembly having the hinge side on the left side.

The door assembly according to FIGS. 1A and 1B includes a door element 1 having a predetermined orientation. The orientation of the door element 1 may be predetermined either by the position and arrangement of functional elements received therein or, alternatively, by the construction of the door element 1 itself. In the example, the orientation of the door element 1 is predetermined, for example, by a decoration in the upper part of the door element 1.

Further, the assembly includes a pushrod system 2 arranged on the rear side and located on the left side of the door element 1 in FIG. 1A. Further, the assembly includes a handle element 3 arranged approximately in the center of the front side of the door element 1 and which, in the example illustrated, includes a fixed part 4, a movable part 5 and a cladding element 6.

The movable part 5 is arranged on the left side of the handle element 3, that is to say the side of the door element 1 on which the pushrod system 2 is located. Otherwise, the handle element 3 is of symmetrical construction. In particular, the securing means of the handle element 3 that fixes the handle element 3 to the door element 1 are constructed to have point symmetry in relation to rotation of the handle element 3 through 180° about its center point, as indicated by the arrow in FIG. 1A. So that the orientation of a brand or other designation on the cladding element 6 can be retained, the cladding element 6 may also be rotated through 180° relative to the fixed part 4.

In the example illustrated, the pushrod system 2 includes an upper pushrod 7a, a lower pushrod 7b and a coupling element 8 that couples the upper pushrod 7a to the lower pushrod 7b and the movable part 5 of the handle element 3. If the movable part 5 of the handle element 3 is withdrawn, the coupling element 8 is rotated in relation to a fixed axis such that the upper pushrod 7a and the lower pushrod 7b are moved downward and upward respectively, with the result that two first pins 9a and 9b are withdrawn from an upper bearing block 10a and a lower bearing block 10b respectively. The respective withdrawable first pins 9a and 9b form part of a closing mechanism of the door assembly. In particular, they may engage in corresponding housing apertures in a housing cabinet (not illustrated in FIG. 1A).

On the opposite, right side edge of the door element 1, two second bearing blocks 11a and 11b (which is hidden in FIG. 1A) are arranged on the rear side, and respective second pins 12a and 12b project downward out of them. The pins 12a and 12b of the second bearing blocks 11a and 11b form a pivot axis for the door element 1 in the example illustrated in FIGS. 1A and 1B.

The arrangement of the movable part 5 on the left side of the door element 1 and the coupling thereof to the coupling element 8 thus has the effect, when the movable part 5 is pulled, simultaneously of releasing the lock on the left side of the door assembly and of pivoting open the door element 1 about the pivot axis thereof on the right side.

To switch the hinge side of the door assembly illustrated in FIGS. 1A and 1B, that is to say to move the pivot axis from the right side to the left side edge of the door element 1 and to move the closing mechanism from the left side edge to the right side edge of the door element, in the example the first bearing blocks 10a and 10b and the second bearing blocks 11a and 11b are released from the door element 1 and switched with one another. For example, a screw connection or latched connection of the bearing blocks 10a and 10b and the bearing blocks 11a and 11b may be released and secured again on the opposite side edge of the door element 1. Advantageously, the securing means that are used to secure the bearing blocks 10a and 10b and the bearing blocks 11a and 11b such as screw holes or latching lugs, for this reason have the same size and/or position.

In addition, on the handle element 3 is released from the door element 1 and turned through 180° to switch the movable part 5 of the handle element 3 from left to right. The turned handle element 3 is then secured to the door element 1 again, for example, being screwed or latched, wherein at the same time the movable part 5 is brought into engagement with the coupling part 8 of the pushrod system 2, which is now located in the region of the right side edge.

If the orientation of the cladding element 6 is to be maintained, in addition the cladding element 6 must be released from the fixed part 4 of the handle element 3 and also turned through 180°. As a result, the direction of opening and the hinge side of the door element 1 are switched, while both the orientation of the door element 1 itself and the orientation of the cladding element 6 are retained.

Figure 2:
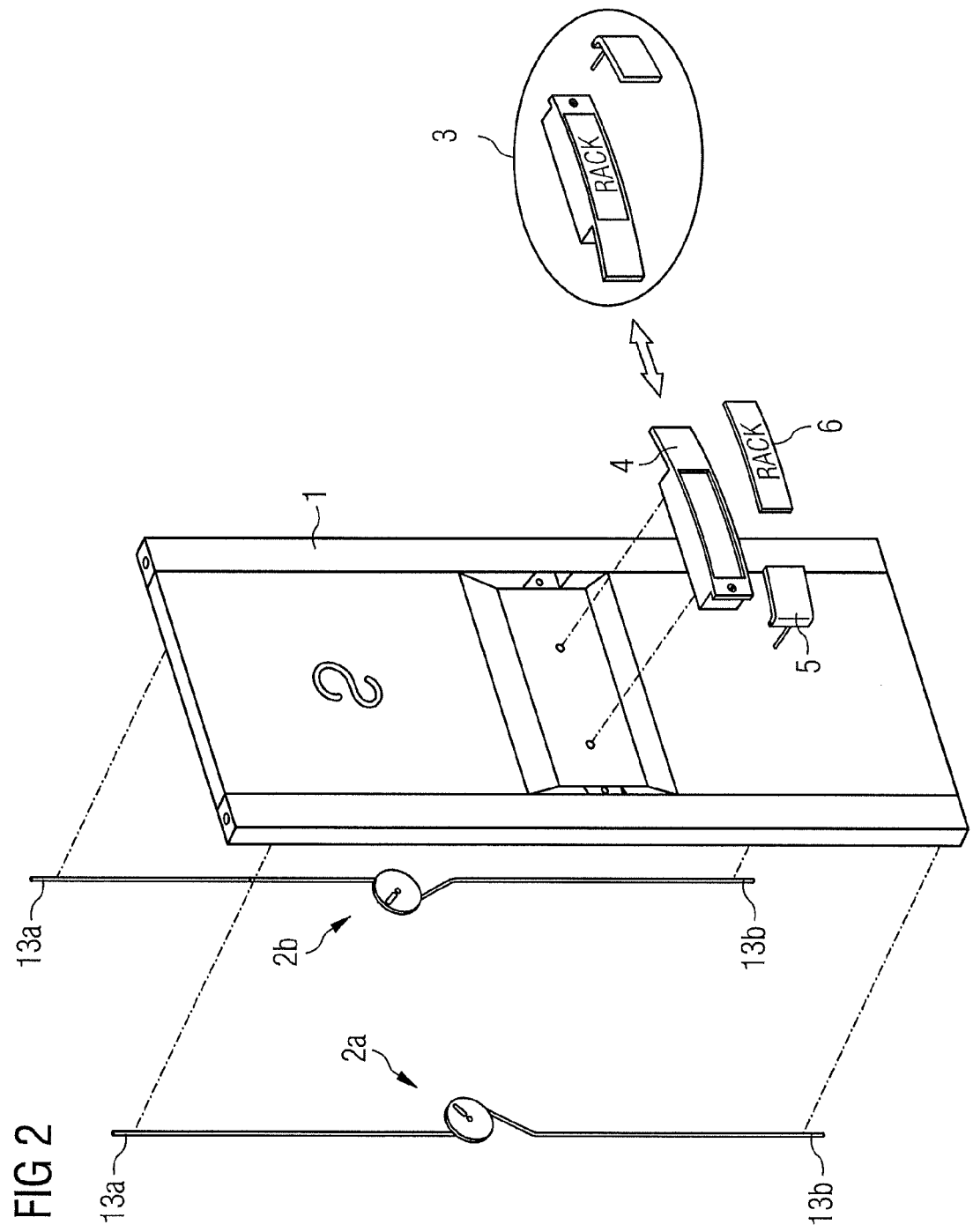
FIG. 2 shows a second example of a door assembly.
Figure 3:
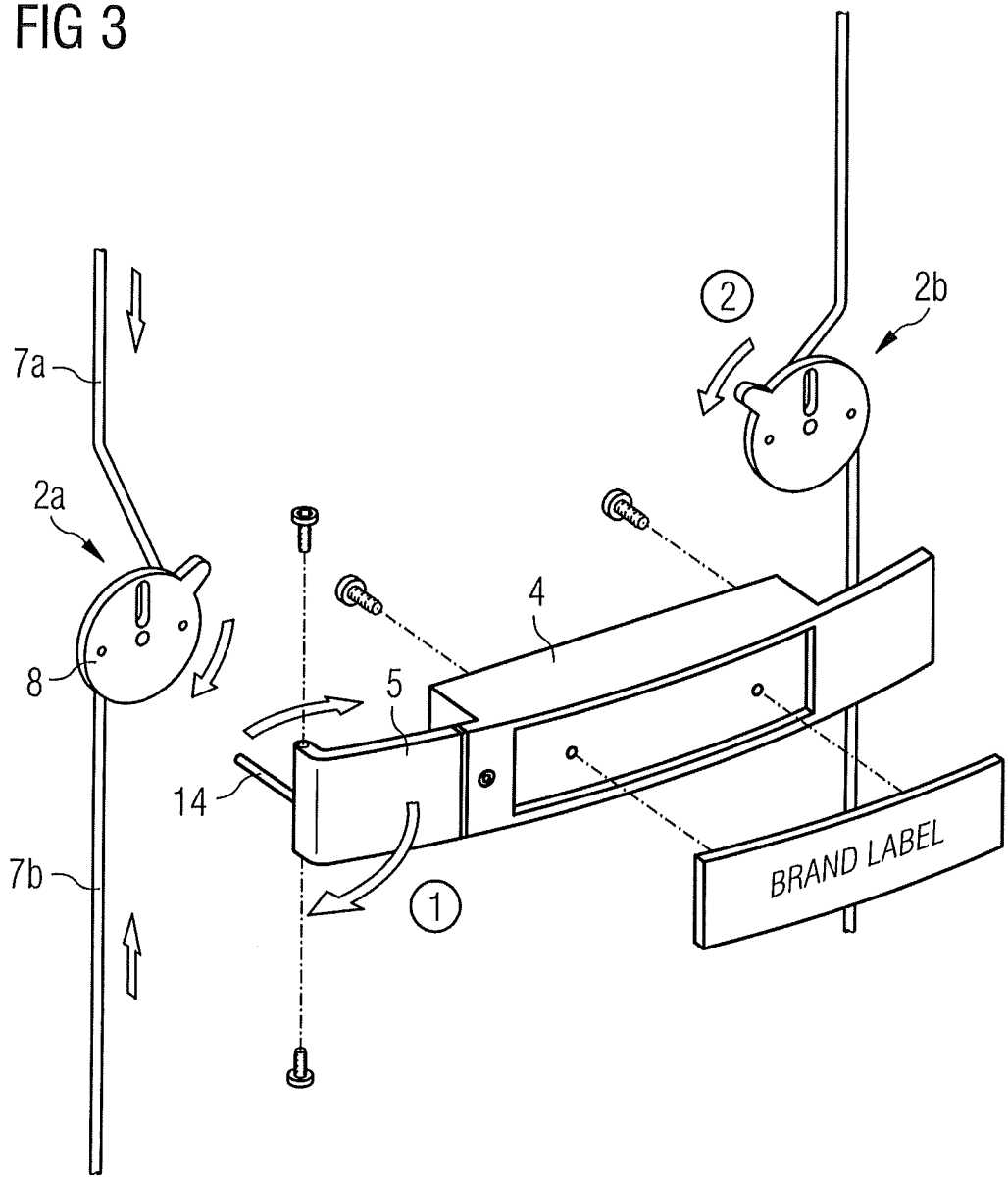
FIG. 3 shows an opening mechanism of a door assembly.

A second example of a proposed door assembly is illustrated in FIGS. 2 and 3.

FIG. 2 shows a door assembly that includes a door element 1, in which in each case two two-part pushrod systems 2a and 2b are installed fixed in the region of a left and a right edge of the door element 1 respectively. On the front side of the door element 1 there is arranged a handle element 3 that may be turned through 180°. In the example illustrated, the handle element 3 is constructed in three parts and includes a fixed part 4, a movable part 5 and a cladding element 6.

The door assembly is largely symmetrical. In particular, apertures for receiving the pushrod systems 2a and 2b are arranged on both sides of the door element 1 and of a frame (not illustrated in the Drawings) of a rack or similar. Moreover, all the securing apertures of the door element 1 are arranged symmetrically, with the result that the handle element 3 and all the associated parts can each be mounted turned through 180°.

FIG. 3 illustrates the opening mechanism of the door assembly in detail. It is in particular clear from this that the two-part pushrod systems 2*a* and 2*b* each include an upper pushrod 7*a* and a lower pushrod 7*b*. As can be seen from FIG. 2, the ends of the pushrods 7*a* and 7*b* each form a hinge pin 13*a* and 13*b*, respectively, that pivot the door element 1 about a left and a right pivot axis, respectively. The pushrods 7*a* and 7*b* connect to one another in the region of the handle element 3 by a rotatable coupling element 8.

On turning the coupling element 8, the pushrods 7*a* and 7*b* may be withdrawn, with the hinge pins 13*a* and 13*b*, with the result that it becomes possible to pivot open the door element 1 about the respectively opposing hinge pins 13*a* and 13*b* that have not been withdrawn. The coupling element 8 may be released either by withdrawing the movable part 5 or by directly turning the coupling element 8 from the rear side of the door element 1. The movable part 5 is for this purpose coupled to the coupling element 8 by way of a coupling pin 14. For this purpose, the door element 1 has an aperture in the region of the handle element 3 and the coupling element 8 has a slot.

To turn the handle element 3, first, the cladding element 6 is released from the fixed part 4 with the result that it becomes possible to release a screw or latch connection of the fixed part 4, which is arranged behind it, from the door element 1. Further, the movable part 5 is released from the door element 1. In the example, the movable part 5 is held on the door element 1 by screw or push-in connections, wherein these connections at the same time form the pivot axis of the movable part 5. Once the fixed part 4 and the movable part 5 have been released, both parts are turned through 180° and connected to the door element 1 again, with the result that the coupling pin 14 of the movable part 5 comes into engagement with the coupling part 8 of the opposite pushrod system 2*b* and it becomes possible to open the door along the opposite pivot axis.

To keep any brand or other designation mounted on the cladding part 6 in the correct orientation on the handle element 3 even after the fixed part 4 has been turned, in addition the cladding part 6 must be latched to the fixed part 4 turned through 180° in relation to the fixed part 4.

When the hinge side is converted from left to right, the orientation of design elements of both the door element 1 itself and of the cladding element 6 is retained.

The mechanism described above allows the hinge side of the door element 1 to be converted from left to right and vice versa in a simple manner.

Further, the door element 1 according to the second example may also be taken off its hinges in a simple manner in that, once the door element has been opened, for example, on the left side, the pushrods 7*a* and 7*b* that act as hinge pins 13*a* and 13*b* on the right side are also withdrawn by turning the coupling element 8 from the rear side.

The invention claimed is:

1. A door assembly for an instrument cabinet comprising:
    a door element having a first side edge and a second side edge opposite the first side edge adapted for installation in a predetermined orientation,
    at least two first withdrawable pins in a region of the first side edge and at least two second pins which form a pivot axis in a region of the second side edge, wherein, in an extended condition, the first pins are in communication with a first depression in the instrument cabinet to prevent the door element from pivoting about the pivot axis and, in a withdrawn condition, extend out of the first depression to permit the door element to pivot about the pivot axis,
    at least one handle element having a fixed part that secures to a front side of the door element and a movable part that mechanically couples to the two first pins, wherein actuation of the movable part allows the first pins which are coupled thereto to move into a retracted condition,
    wherein the door element and the handle element are of symmetrical construction such that releasing the handle element from the door element, turning it through 180 degrees and securing the handle element to the door element, enables the at least two first withdrawable pins and the at least two second pins to be switched from the first side edge to the second side edge and vice versa.

2. The door assembly according to claim 1, wherein the two first pins and the two second pins releasably connect to the door element with a securing device, wherein the securing device is constructed such that the two first pins and the two second pins may be switched with one another to perform a change of the pivot axis from the first side edge to the second side edge.

3. The door assembly according to claim 2, wherein the handle element includes at least one cladding element having the predetermined orientation, the cladding element may be latched to the fixed part of the handle element such that when the hinge side is changed by releasing the cladding element, turning it through 180 degrees in relation to the fixed part and latching the turned cladding element the predetermined orientation of the cladding element may be maintained.

4. The door assembly according to claim 1, wherein the first pins are constructed as withdrawable first hinge pins which in an extended condition form a pivot axis in the region of the first side edge, and the second pins are constructed as withdrawable second hinge pins, which in an extended condition are in communication with a second depression in the instrument cabinet to prevent the door element pivoting about the pivot axis of the first side edge and, in a withdrawn condition, extend out of the second depression to permit the door element to pivot about the pivot axis of the first side edge, wherein the movable part of the at least one handle element mechanically couples to the two first hinge pins or the two second hinge pins, and wherein actuation of the movable part allows the hinge pins, which are each coupled thereto, to move into the retracted condition.

5. The door assembly according to claim 4, wherein a left edge of the door element forms the first side edge and a right edge of the door element forms the second side edge such that releasing the handle element, turning it through 180 degrees and securing the turned handle element enables the hinge side of the door assembly to be switched from left to right.

6. The door assembly according to claim 5, wherein the first and the second hinge pins are each constructed as part of a pushrod, and the pushrods are connected to one another in the region of the first and the second side edges within each case at least one rotatable coupling element.

7. The door assembly according to claim 6, wherein the coupling elements are accessible from a rear side of the door element and make it possible to withdraw the pushrods forming the pivot axis such that the opened door element may be unhinged from the instrument cabinet.

8. The door assembly according to claim 5, wherein the handle element includes at least one cladding element having the predetermined orientation, the cladding element may be latched to the fixed part of the handle element such that when the hinge side is changed by releasing the cladding element, turning it through 180 degrees in relation to the fixed part and latching the turned cladding element the predetermined orientation of the cladding element may be maintained.

9. The door assembly according to claim 4, wherein the first and the second hinge pins are each constructed as part of a pushrod, and the pushrods are connected to one another in the region of the first and the second side edges within each case at least one rotatable coupling element.

10. The door assembly according to claim 9, wherein the coupling elements are accessible from a rear side of the door element and make it possible to withdraw the pushrods forming the pivot axis such that the opened door element may be unhinged from the instrument cabinet.

11. The door assembly according to claim 10, wherein the handle element includes at least one cladding element having the predetermined orientation, the cladding element may be latched to the fixed part of the handle element such that when the hinge side is changed by releasing the cladding element, turning it through 180 degrees in relation to the fixed part and latching the turned cladding element the predetermined orientation of the cladding element may be maintained.

12. The door assembly according to claim 9, wherein the handle element includes at least one cladding element having the predetermined orientation, the cladding element may be latched to the fixed part of the handle element such that when the hinge side is changed by releasing the cladding element, turning it through 180 degrees in relation to the fixed part and latching the turned cladding element the predetermined orientation of the cladding element may be maintained.

13. The door assembly according to claim 4, wherein the handle element includes at least one cladding element having the predetermined orientation, the cladding element may be latched to the fixed part of the handle element such that when the hinge side is changed by releasing the cladding element, turning it through 180 degrees in relation to the fixed part and latching the turned cladding element the predetermined orientation of the cladding element may be maintained.

14. The door assembly according to claim 1, wherein the handle element includes at least one cladding element having the predetermined orientation, the cladding element may be latched to the fixed part of the handle element such that when the hinge side is changed by releasing the cladding element, turning it through 180 degrees in relation to the fixed part and latching the turned cladding element the predetermined orientation of the cladding element may be maintained.

15. The door assembly according to claim 14, wherein the latch connection or screw connection of the handle element may be released after releasing the cladding element such that it is possible to turn the handle element without unhinging the door element.

16. The door assembly according to claim 1, wherein the handle element may be latched or screwed to the door element.

17. The door assembly according to claim 16, wherein the latch connection or screw connection of the handle element may be released after releasing the cladding element such that it is possible to turn the handle element without unhinging the door element.

18. A method for changing a hinge side of a door arrangement comprising a door element adapted for installation in a predetermined orientation, having a first side edge and a second side edge opposite the first side edge, at least one closing mechanism formed by two first withdrawable pins, in a region of the first side edge and at least one pivot axis, which is formed by two second pins in a region of the second side edge and at least one handle element having a fixed part that secures to a front side of the door element and a movable part mechanically coupled to the two first pins to withdraw the two first pins comprising:
   releasing the handle element from the door element, wherein the mechanical coupling to the two first withdrawable pins is released,
   turning the handle element through 180 degrees in relation to the door element such that the movable part is switched from the first side edge to a second side edge, and
   securing the turned handle element to the door element.

19. The method according to claim 18, further comprising:
   releasing the two first pins and the two second pins from the door element,
   switching the two first pins and the two second pins with one another, and
   securing the switched two first pins and the two second pins such that the withdrawable first pins are arranged in the region of the second side edge and the two pins are arranged in the region of the first side edge, and in securing the turned handle element, the movable part of the handle element which withdraws the first pins is mechanically coupled to the first withdrawable pins in the region of the second side edge.

20. The method according to claim 18, wherein the two first and the two second pins are constructed as withdrawable hinge pins, and in securing the turned handle element, the movable part of the handle element for withdrawing the second hinge pins, is mechanically coupled to the second withdrawable hinge pins.

\* \* \* \* \*